United States Patent [19]

Aoyama

[11] Patent Number: 5,074,742

[45] Date of Patent: Dec. 24, 1991

[54] PARTS FEEDING METHOD AND APPARATUS

[76] Inventor: Yoshitaka Aoyama, 20-11, Makitsukadai 2-chome, Sakai Osaka 590-01, Japan

[21] Appl. No.: 574,562

[22] Filed: Aug. 29, 1990

Related U.S. Application Data

[63] Continuation of Ser. No. 279,692, Dec. 5, 1988, abandoned.

[30] Foreign Application Priority Data

| Dec. 5, 1987 | [JP] | Japan | 62-307989 |
| Dec. 5, 1987 | [JP] | Japan | 62-307990 |
| Dec. 12, 1987 | [JP] | Japan | 62-315033 |
| Dec. 12, 1987 | [JP] | Japan | 62-315034 |

[51] Int. Cl.$^5$ .................................................. B66L 1/00
[52] U.S. Cl. .................................... 414/737; 901/40; 198/468.5; 221/212; 294/65.5; 414/786

[56] References Cited

U.S. PATENT DOCUMENTS

| 2,471,764 | 5/1949 | Miller et al. | 294/65.5 |
| 2,683,618 | 7/1954 | Long | 294/65.5 |
| 2,976,075 | 3/1961 | Budreck | 294/65.5 |
| 3,200,931 | 8/1965 | Voorhies | 221/212 |
| 3,905,631 | 9/1975 | Ricks et al. | 294/65.5 |
| 4,943,098 | 7/1990 | Aoyama | 901/40 X |

FOREIGN PATENT DOCUMENTS

| 0230702 | 12/1985 | France | 901/40 |
| 3536982 | 4/1987 | France | 294/65.5 |
| 56-14943 | 4/1981 | Japan | 198/468.5 |
| 59-07549 | 2/1984 | Japan . | |
| 259743 | 11/1987 | Japan | 414/222 |
| 259744 | 11/1987 | Japan | 414/222 |
| 956235 | 9/1982 | U.S.S.R. | 221/212 |
| 738193 | 10/1955 | United Kingdom | 294/65.5 |

*Primary Examiner*—Robert J. Spar
*Assistant Examiner*—William M. Hienz
*Attorney, Agent, or Firm*—Armstrong, Nikaido, Marmelstein, Kubovcik & Murray

[57] ABSTRACT

A method and apparatus are described for conveying and supplying a part, such as a projection nut, to a predetermined point in space. The apparatus comprises a telescopic supply rod including an outer and inner shaft, two magnets being associated with a proximal end of one of the two shafts. The supply rod first extends in its entirety towards the predetermined point, or destination, with the part being attracted and held at the proximal end by the magnets. Relative displacement in longitudinal direction of the outer and inner shafts takes place as the part reaches the destination and, consequently, the magnets are moved away from the part so that magnetic force on the part is no more influential, whereupon the part is allowed to fall under gravity down to the destination.

4 Claims, 3 Drawing Sheets

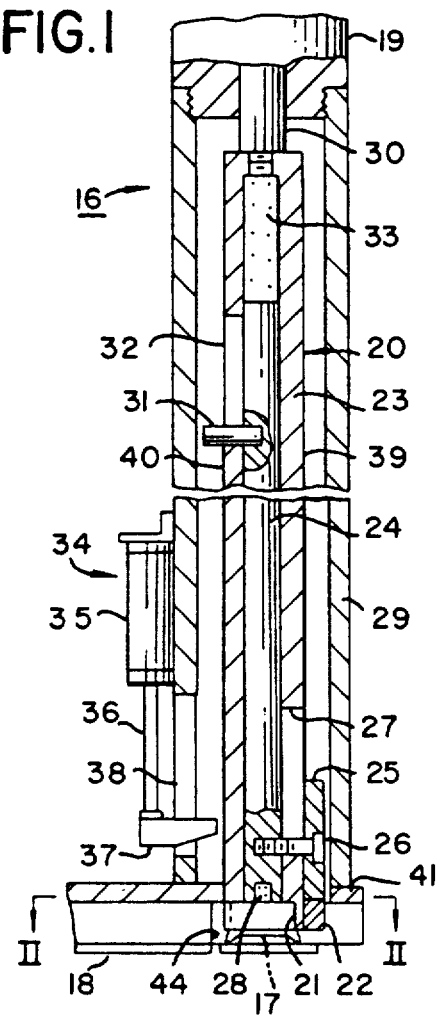
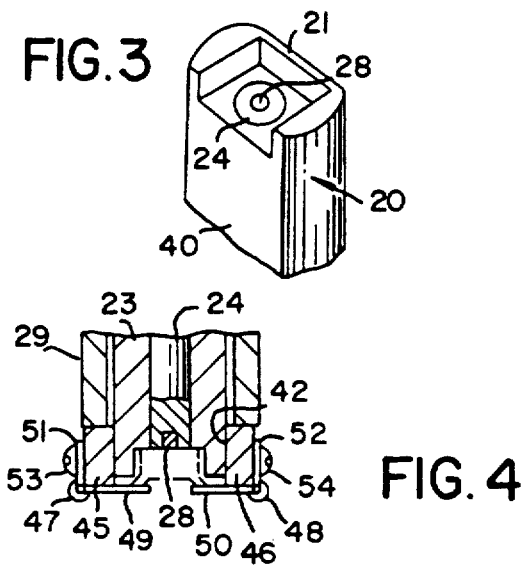
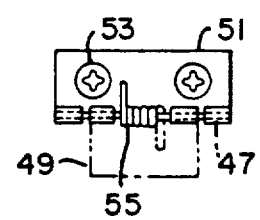
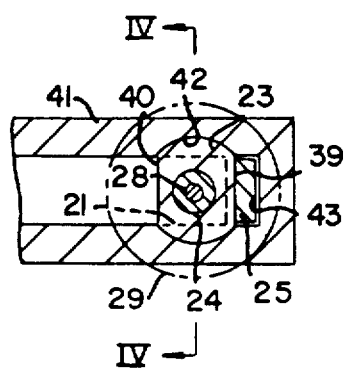
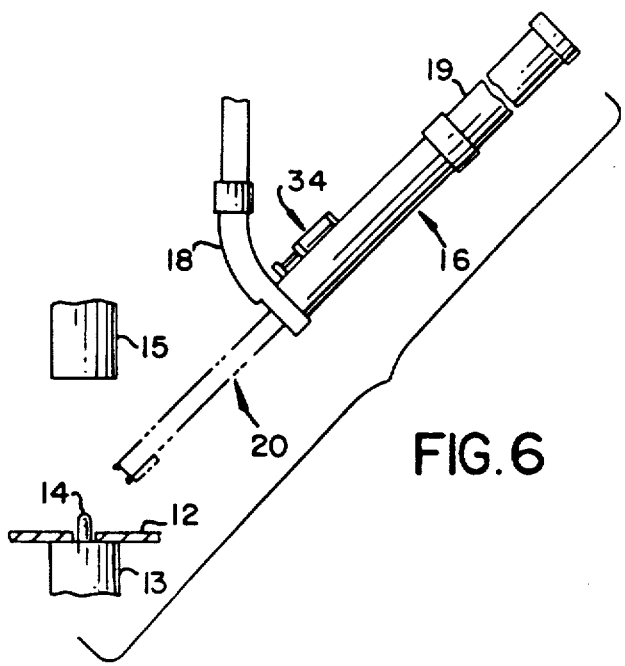

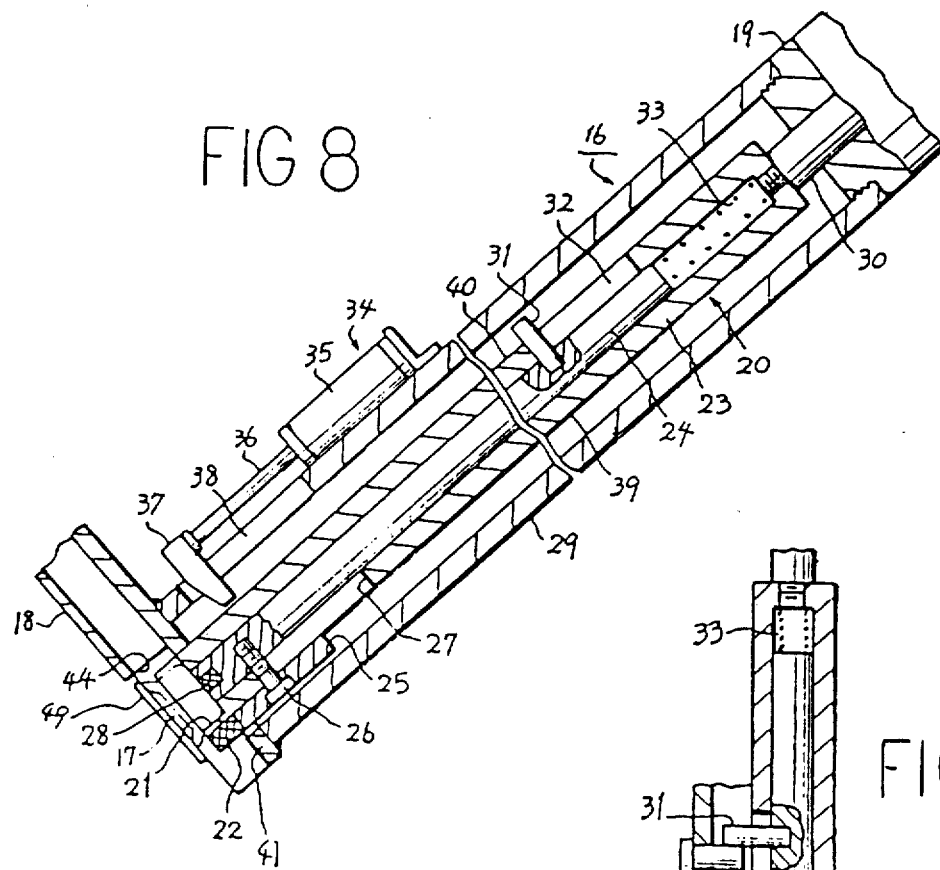
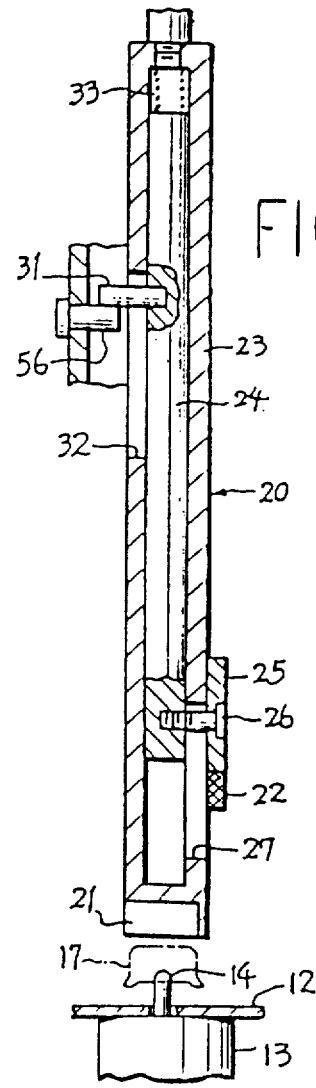
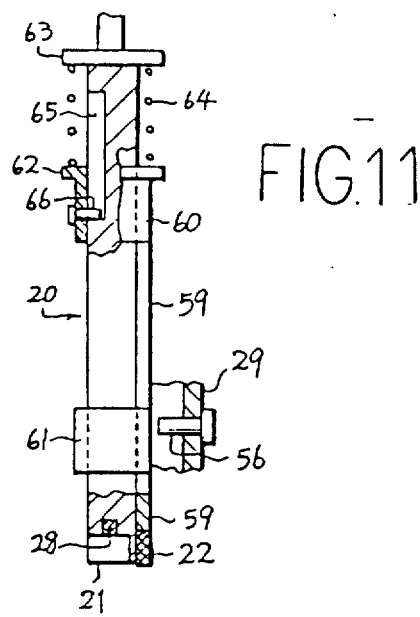

PARTS FEEDING METHOD AND APPARATUS

This application is a continuation of application Ser. No. 07/279,692, filed Dec. 5, 1988, now abandoned.

BACKGROUND OF THE INVENTION

1. Field of the Invention

This invention relates to a parts feeding method and apparatus which feeds the parts such as a projection nut having projection for welding, a short thick pipe or a head bolt.

2. Prior Art

A conventional technology which is deemed nearest one to the present invention is disclosed in the Japanese patent publication No. 59-7549 and its gist is shown in FIGS. 12 and 13, wherein an inner shaft 2 is slidably inserted into a hollow outer shaft 1 and a magnet (permanent magnet) 4 for attracting a part (projection nut) 3 is fixed to an end of the inner shaft 2. An outer cylinder 5 which houses the outer shaft 1 is fixed to a stationary member 6 as shown in FIG. 12, and a pin 8 fixed to the outer shaft 1 is inserted into a guide groove 7 in an inner surface of the outer cylinder 5 in a direction of a stroke. A paired sheet metal part 9 is placed on a fixed electrode 10, and a guide pin 11 of the fixed electrode extends upward through a hole of the sheet metal part 9.

The end surface of both the shafts 1 and 2 are aligned to form the same one plane, on which a nut 3 is attracted. Remaining in this condition, both the shafts proceed to a predetermined position in one body, and on arrival at the position movement of the inner shaft 2 is stopped and only the outer shaft 1 proceeds further to separate the nut 3 from the magnet 4 as shown in FIG. 13, so that the magnetic attraction force applied to the nut 3 is substantially eliminated. By this actuation, the nut 3 separates from the end surface of the outer shaft 1 and jumps to the guide pin 11, to which a nut 3 hole is fitted in, whereby the feed is completed. A space transit distance L is shown in FIG. 13.

While a mechanism which stops advance of the shaft 2 is not shown in a figure, a limit pin fixed to the inner shaft 2 is projected from an elongated hole formed in the outer shaft so that when both the shafts 1 and 2 are advanced by a predetermined distance, whereby the advance of the inner shaft 2 is forced to stop as a result of the limit pin engaging with the stationary member, and only the outer shaft 1 advances to reduce the magnet 4's attraction force on the nut, the nut inertially falling toward the guide pin 11.

In the conventional technology mentioned above, the magnetic attraction force on the nut 3 is substantially eliminated during a transient period in which the magnet stops and the outer shaft is further advancing, therefore the following problems arise. That is, the first problem is that since the attraction force on the nut is gradually decreased while only the outer shaft is advancing, when some external force or vibration acts on the nut before it reaches a predetermined position, the nut can sometimes fall to cause a feed failure. The second problem is that a feed mechanism depends on substantial elimination of the attraction force on the nut, but timing at which the nut separates from the outer shaft is not constant owing to a variation of nut weight or viscosity of oil on the nut. Therefore, space transit distances of the nuts vary from a short to a long one, thus causing a trouble with feed operation stability. Thus, owing to variation in the space transit distance, this distance is required to be set to a longer one in favor of the longest, and this makes the space transit distance long, causing feed failures.

Furthermore, in the above-mentioned conventional technology, the attraction force of the magnet 4 fails to act sufficiently on the nut 3 because of a nut hole, and mounting the magnet 4 on the inner shaft 2 needs to limit a magnet size. In addition, since the nut 3 contacts only end surfaces of both the shafts 1 and 2, some external force or vibration can displace the nut 3 to impair fitness between the nut hole and the guide pin 11, causing the nut to be flipped by the guide pin 11.

Searching further for causes of the above problems, they originate in the structures for magnet installation. That is, in the conventional technology, the magnet is fixed to a tip of the inner shaft as shown in the figures, so that it is impossible to enhance the attraction force on a part if a hole is formed in the part as in a nut, thus a fall of the nut is caused by the external force or vibration as mentioned above.

A still more important problem is that insufficient magnetic attraction force obstructs providing the feed rod with a higher speed advance, thus bringing a great disadvantage in time-shortening for parts feeding.

SUMMARY OF THE INVENTION

A principal object of the present invention is to provide a parts feeding method and apparatus that can solve the above-mentioned problems.

In one embodiment of the invention, in a feeding apparatus which conveys a part being attracted to an end surface of a feed rod to supply, a magnet is movably disposed in a position projecting from the feed rod so as to exert attractive force on a part outside surface, and this magnet is forced to retreat immediately after the feed rod reaches a predetermined position to stop or at nearly the same time as this stop. A constant magnetic attraction force is applied to the part by magnetic force of the magnet while the feed rod is advancing, and the attraction force is eliminated immediately when or after the part reaches the predetermined position, whereby part feeding to the predetermined position is completed. Therefore, the attraction force on the part is maintained at a constant value until the feed rod reaches the predetermined position, ensuring that the part does not easily fall off from the feed rod end even if some external force or vibration acts on the part during movement. Further, the magnet is forced to retreat immediately when or after the part on the feed rod end reaches the predetermined position to stop, and therefore the position and timing in which the part separates from the feed rod can be maintained constant, thus realizing a stable parts feeding. Especially, since the magnetic attraction force is released after the part reaches the predetermined position, for example, the part can be released at a very close range to an electrode guide pin, thereby completely avoiding parts feeding mistakes.

In another embodiment of the present invention, a feed rod is provided which conveys a part being attracted to its end surface, and a magnet for exerting attraction force on the part outside surface with the attraction force is movably disposed in a position projecting from the feed rod, and the feed rod end is equipped with a projection which holds the outside of the part. By the magnetic attraction force applied to the outside of a part surface and the projection's holding action on the outside of a part, the part is stably disposed on the rod end during the movement to the predetermined position. The attraction force on the part is released by magnet retreat, whereby parts feeding to the predetermined position is completed. The magnet is so formed that it projects from the outside of the feed rod, thus, a large size magnet can be used as required, to avoid shortage in the magnetic attraction force. On the other hand, the projection for part holding performs additional holding function, and accordingly a smaller sized magnet can be used. The outside of the part being held with the projection, the part will not suffer displacement or abrupt drop.

In still another embodiment of the invention, in a parts feeding apparatus which conveys a part being attracted to an end surface of a feed rod to supply, the feed rod is movably supported in a sloped condition with respect to the vertical direction and a magnet for exerting attraction force on the outside of the part is movably disposed in a position which is projecting from the feed rod and is situated beneath the sloped feed rod, and a parts feeding path is so disposed that the part rushes toward the projecting magnet, and when the feed rod advances to release the part, the magnet is forced to retreat. The part is caught, attracted and held with the magnet from an underside of the sloped feed rod, whereby the part is stably held on the rod end, then the feed rod is advanced. The magnetic attraction force on the part is released by the magnet retreat and parts feeding to the predetermined position is surely completed. The feed rod is sloped and the magnet is disposed beneath the sloped portion, and thus the part rushing from the parts feeding path is caught, attracted and held by the magnet, holding the part surely on the feed rod end, so that the part will not be displaced from a holding position even under some external force or vibration. The part which is surely held with the above sloped condition and catching method by the magnet is substantially released from the attraction force by the magnet retreat when the feed rod advances to release the part, thus the part is surely separated from the feed rod and excellent high reliability for parts feeding is ensured.

In a still other embodiment of the invention, in a feeding apparatus which conveys a part being attracted to an end surface of a feed rod, a magnet for exerting attraction force on the outside surface of the part is movably disposed in a position projecting from the feed rod, the magnet is forced to retreat at the near end of a stroke in the course of advance. A constant strong attraction force is applied to the part by magnetic force of the magnet while the feed rod is advancing, and the magnetic attraction force is quickly eliminated before the part reaches the predetermined position while the rod is advancing, and thus parts feeding to the predetermined position is completed.

BRIEF DESCRIPTION OF THE DRAWINGS

The above and other features of the present invention will become more apparent from the following description making reference to the accompanying drawings for only illustration:

FIG. 1 is a vertical section view showing a parts feeding apparatus;

FIG. 2 is a sectional view taking along line II—II of FIG. 1;

FIG. 3 is a perspective view showing a feed rod end surface;

FIG. 4 is a sectional view taking along line IV—IV of FIG. 2;

FIG. 5 is a side view showing an opening and closing plate;

FIG. 6 is a side elevational view showing an outline of an apparatus;

FIG. 8 is a vertical sectional view showing another embodiment of the present invention;

FIG. 10 is a vertical section view showing a still further embodiment of the present invention;

FIG. 11 is a side view similar to FIG. 9 showing a still further embodiment of the present invention;

DESCRIPTION OF THE PREFERRED CONCRETE EMBODIMENTS

Figure 7:
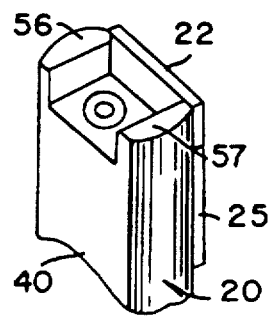
FIG. 7 is a view similar to FIG. 3 showing a modification of a feed rod end.
Figure 12:
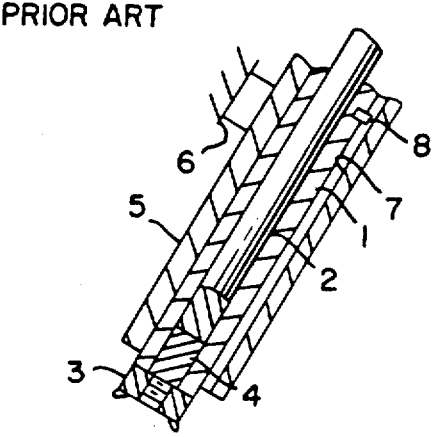
FIGS. 12 and 13 are vertical section views explaining the conventional technology.

An embodiment shown in FIGS. 1-5 is first described. As shown in FIG. 6, it is a spot welding device, in which a paired steel plate part 12 is set on a fixed electrode 13 and a guide pin 14 of the electrode is projecting from the steel plate part 12. A part marked with numeral 15 is a movable electrode coaxially set to the fixed electrode 13.

A feed unit 16 incorporating a feed rod 20 is connected with a feed pipe 18 for projection nuts 17 (in the embodiment herein, a projection nut is exemplified) and an air cylinder 19. An end surface of the feed rod 20 is adapted to being in contact with the nut 17 as shown with a two-dot chain line of FIG. 1 and is provided with a projection 21 which holds the nut 17 from outside. The projection 21 is formed into a U shape frame as shown in FIG. 3. The feed rod 20 is preferably made of stainless steel.

A magnet 22 which exerts attractive force on an outer surface of the nut 17 is projected from the end surface of the feed rod 20 and is able to move forward and backward with respect to the feed rod 20. In this embodiment, the feed rod 20 is double-structured to move the magnet 22 forward and backward and the feed rod 20 itself is a hollow shaft 23, into which an inner shaft 24 is slidably inserted. The magnet 22 is coupled to a sliding member 25 which contacts with an outer surface of the hollow shaft 23, and the inner shaft 4 and the sliding member 25 are integrated into one body with a bolt 26. An elongated hole 27 is formed in the hollow shaft 23 in a direction of a stroke, and the bolt 26 penetrates this hole.

A bottom end surface of the inner shaft 24 can be in alignment in a plane with a bottom end surface of the hollow shaft 23 and has a small magnet (permanent magnet) 28 embedded therein for therein providing the nut 17 with upward small magnetic attraction.

The feed rod 20 is housed in an outer cylinder 29 with a clearance therebetween as shown, and the air cylinder 19 is coupled to an upper portion of the outer cylinder 29 and the feed pipe 18 is welded at a lower portion of the outer cylinder 29. A piston rod 30 of the air cylinder 19 is coupled to the feed rod 20. A limit pin 31 is fixed to the inner shaft 24 and penetrates an elongated hole 32 extending in a direction of the hollow shaft 23's stroke and projects from the feed rod 20. A coil spring 33 inserted into the hollow shaft 23 exerts tension on the inner shaft 24 and the tension is restricted by the abutment of the limit pin 31 on the lower end wall of the hole 32.

In order to retract the magnet 22 when the feed rod 20 travels just a predetermined distance and stops, that is, immediately after a part reaches a given point or at almost the same time as this stop, a driving device 34 is installed outside the outer cylinder 29. As a driving device for this equipment an electromagnetic solenoid may be used, although an air cylinder 35 is used in this embodiment. A stopper 37 fixed to a piston rod 36 of the air cylinder 35 projects inside the outer cylinder 29 through an elongated hole 38 extending in the outer cylinder 29 in the direction of the stroke and is capable of engagement with the limit pin 31.

As can be clearly seen from FIG. 2, the feed rod 20 (hollow shaft 23) has a nearly oval shape section by forming planes 39 and 40 on both sides of the rod and is tightly inserted into a through hole 42 to stop its rotation. An upper plate 41 is provided with a cutout portion 43 for receiving a sliding member 25.

The feed pipe 18 has a rectangular section, whose end portion is provided with a cutout portion 44 shown in FIG. 1 to form forked projecting pieces 45, 46 (FIG. 4), to which pivots 47, 48 are fixed, and opening and closing plates 49, 50 are pivotally fixed to the pivots 47, 48 respectively. In summary, one wing of a hinge serves as the opening and closing plate 49, 50 and the other wing a fixed plate 51, 52 which is fixed to the projecting piece 45, 46 with a bolt 53, 54. A coil spring 55 mounted about the pivot 47, 48 (in FIG. 5, a pivot 47 side only is illustrated) provides the opening and closing plate 49, 50 with elasticity in a direction of closing to hold the state of FIG. 4. A two dot chain line of FIG. 5 shows the opening and closing plate 49 in its opened state. A lower portion of the feed rod 20 is so designed that it penetrates the through hole 42 as mentioned above, thereby rendering the nut 17, which is supplied from the feed pipe (parts feed path) 18, possible to move for the magnet 22.

Operation of the above embodiment will now be explained. When the nut 17 pushed with compressed air in the feed pipe 18 approaches an end of it, the nut 17 is attracted by the magnet 22 to be introduced into the projection 21 and occupies the position shown with a two dot chain line in FIGS. 1 and 4. Then, as the feed rod 20 proceeds, the nut 17 pushes and opens the opening and closing plates 49 and 50 and further advances in an attracted condition due to the magnet 22 and stops near the fixed electrode guide pin 14. In the next step, when the stopper 37 is lifted by actuation of the air cylinder 35, this movement is transmitted to the sliding member 25 via a limit pin 31, inner shaft 24, and bolt 26 to separate the magnet 22 (together with another magnet 28) from the nut 17 and, therefore, magnetic attractive force applied to the nut 17 is substantially eliminated, and the threaded hole of the nut is penetrated with the guide pin 14 to complete nut feed.

In the case of relatively low speed feed cycle operation of the feed rod 20, retreat of the magnet 22 may be effected at the time when a short time has elapsed after the feed rod 20 stopped. In the cases where the above feed cycle is shortened, however, the retreat timing of the magnet 22 is reasonably determined to be at nearly the same time as the feed rod 20's stop. This nearly same timing means a time range zone including the timings immediately before, at the same time and immediately after the feed rod 20's stop.

An embodiment of FIG. 7 is the one giving a modification in the form of the projection on the feed rod end. In the prior embodiment, the projection 21 is formed into U shape, but in this embodiment, it is formed with two opposed projections 56, 57 spanned by a magnet 22 so that the magnet 22 directly contacts the nut 17 as shown in FIG. 7.

As shown in FIG. 8, the feed rod 20 may be supported in a sloped state with respect to the vertical direction. In this case, the nut 17 is caught by the magnet 22 from the lower side so as to be attracted and held in position.

Figure 9:
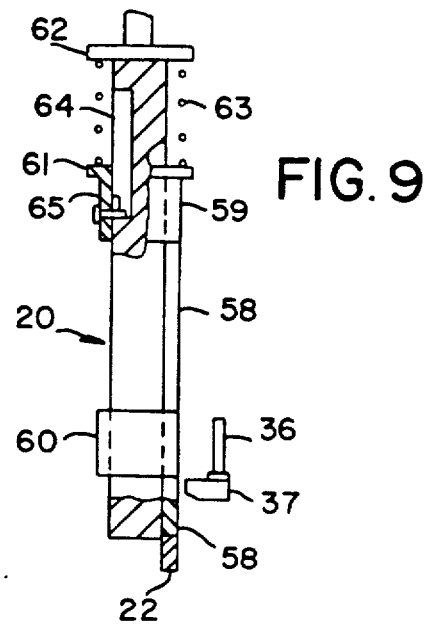
FIG. 9 is a side view showing still another embodiment of the present invention.

In an embodiment of FIG. 9, the magnet 22 is moved forward and backward with an actuating lever 58 mounted along the outside of the feed rod 20 and this actuator lever 58 is installed between guide cylinders 59 and 60 to improve slidability with respect to the feed rod 20. Between a flange 61 of the guide cylinder 59 and a flange 62 of a feed lever rod, a coil spring 63 is positioned, and a pin 65 fixed to the guide cylinder 59 is inserted into a groove 64 formed in a direction of the feed rod 20's stroke, whereby tension of the coil spring 63 is received. After the whole feed rod 20 proceeds to a predetermined position to stop, the same operation as that of the prior embodiments is performed, the stopper 37 causing forces the flange 61 to retreat. In the present embodiment, the feed rod 20's end is provided with no equivalents to the projection 21 and the magnet 28 of the prior embodiments but is formed into a mere even plane.

An embodiment of FIG. 10 is for a case having no drive device mentioned above. In this embodiment, relative retreat of a magnet 22 is obtained by an engagement of a limit pin 31 with a stationary member. This stationary member is most easily realized by forming a projecting piece 56 projected into an inside of an outer cylinder 29. In this case, the feed rod 20 still proceeds after the magnet 22 stops and upon the nut 17 separates from the magnet 22 to some extent so that the magnetic attraction force applied to the nut 17 is substantially eliminated the rod 20, stops and at the same time the nut escapes from the projection 21 with the force of inertia and is fed to the guide pin 14. In this embodiment, the above-mentioned magnet 28 is not used and the inner shaft 24 is so designed that its bottom portion is not projected from the bottom surface of the feed rod 20.

In an embodiment of FIG. 11, a magnet 22 is moved forward and backward with an actuating lever 59 disposed along an outside of a feed rod 20 and this actuating lever 59 is installed between guide cylinders 60 and 61 to improve slidability with respect to the feed rod 20. Between a flange 62 of the guide cylinder 60 and a flange 63 of the feed rod, a coil spring 64 is disposed, and a pin 66 fixed to the guide cylinder 60 is inserted into a groove 65 formed in a direction of the feed rod 20's stroke, whereby tension of the coil spring 64 is received. When the whole feed rod 20 proceeds, the flange 62 is stopped by a projecting piece 56 and the same feed operation as that of the embodiment of FIG. 10 is performed.

Figure 13:
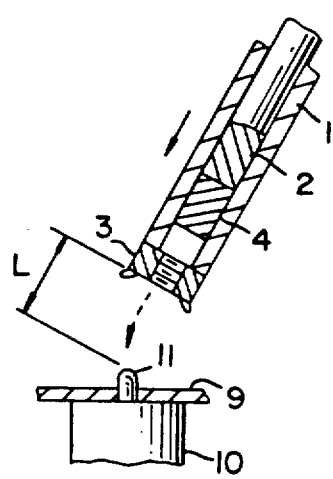

In the embodiments described so far, after the nut 17 which is attracted and held with the magnet 22 at the feed rod 20's end reaches a predetermined position near the fixed electrode guide pin 14 to stop, or at a nearly same time as that stop, the magnetic attraction force is eliminated, but the attraction force may be eliminated at near the end of the stroke in the course of advance. As can be seen from the foregoing descriptions and illustrations, the magnet is moved forward and backward in a condition in which the magnet provides a part outside of the surface with the attraction force, that is, the magnet closely contacts the feed rod outside surface. We can therefore use a large-sized magnet and expect strong attractive and holding force, ensuring that the part is not falling down by some external force or vibration and furthermore we have no trouble about minute movement or fall off of the part even at a higher speed feed stroke than before. When the magnetic attraction force is increased, the magnet must be separated from the part by a considerable distance to substantially eliminate the attraction force applied to the part. For this reason, the magnet is forced to move in a reverse direction at near the end of a stroke in the course of advance, that is, at an early stage, whereby the above long separation distance can be attained in a short period of time. That is, the feed rod advance speed is added to the speed of the magnet reverse movement; this is effective for shortening an operating time and results in fast elimination of the attraction force. Therefore the part can escape from the rod at a constant position. Thus high reliability with no feed failure can be obtained. Still further, by determining the constant position for part escape, a distance between the feed rod stop position and a designated position, for example, the fixed electrode guide pin position can be made very short, whereby the problem of long distance L as discussed previously with reference to FIG. 13 is eliminated.

It will be apparent from the foregoing that, while particular forms of the invention have been illustrated and described, various modifications can be made. Such modifications should not be deemed departing from the spirit and scope of the invention, and it is intended that all modifications and amendments which are obvious to those skilled in the art are included within the following claims.

What is claimed is:

1. In a parts feeding method in which a part is conveyed by a feed rod having a first magnet at one end thereof, said part being attracted at one of its end surfaces to said one end of said feed rod by said first magnet, the steps comprising positioning a second magnet for applying an attractive force to an outer side surface of said part, holding said part on said feed rod by the attractive force of said magnet on said one end surface and the attractive force of said second magnet on said side surface, the attractive force of said first magnet on said one end surface being directed substantially perpendicular to the attractive force of said second magnet on said side surface, moving said feed rod, with said part attached thereto, toward a stop position and, at a pre-set point relative to said feed rod reaching said predetermined stop position, retracting said first and second magnets and releasing said attractive forces.

2. In a parts feed rod for feeding a part, said feed rod having a first magnet at one end thereof, said part being attracted at one of its end surfaces to said one end of said feed rod, the improvement comprising, a holding projection in said one end of said feed rod for receiving the part to be fed, a second magnet movably positioned at a position projecting from a side of said feed rod for applying an attractive force to a side surface of said part received in said holding projection, the attractive force of said first magnet on said one end surface being directed substantially perpendicular to the attractive force of said second magnet on said side surface, and means for moving said first and second magnets into a first position for attracting said part in said holding projection and for moving said first and second magnets into a second position for releasing said part from said holding projection at a pre-set point relative to said feed rod reaching a predetermined stop position.

3. In a parts feed rod for feeding a part, said feed rod having a first magnet at one end thereof, said part being attracted at one of its end surfaces by said first magnet, to said one end of said feed rod, the improvement comprising, said feed rod moving in a sloped vertical path, a holding projection at said one end of said feed rod for receiving a part to be fed, means for feeding said part to said one end of said feed rod, a second magnet movably positioned at a position projecting from a side of said feed rod said second magnet applying an attractive force to a side surface of said part received in said holding projection, the attractive force of said first magnet on said one end surface being directed substantially perpendicular to the attractive force of said second magnet on said side surface, and means for moving said first and second magnets into a first position for attracting said part in said holding projection and for moving said first and second magnets into a second position or releasing said part from said holding projection at a pre-set point relative to said feed rod reaching a predetermined stop position.

4. In a parts feeding method in which a part is conveyed by a feed rod while attracted at one of its end surfaces to a feed rod end surface of said feed rod by a first magnet, the steps comprising, positioning said part to be conveyed in a holding projection in said end of said feed rod and movably positioning a second magnet at a position projecting from said feed rod for attracting a side surface of said part in said holding projection, the attractive force of said first magnet on said one end surface being directed substantially perpendicular to the attractive force of said second magnet on said side surface, and, at a pre-set point relative to said feed rod reaching a predetermined stop position, retracting said first and second magnets and releasing said attracted part from said holding projection in said end of said feed rod.

* * * * *